July 3, 1928.

A. M. STANLEY ET AL

1,675,734

WELDING MACHINE

Original Filed Nov. 25, 1921　　9 Sheets-Sheet 3

July 3, 1928.  1,675,734
A. M. STANLEY ET AL
WELDING MACHINE
Original Filed Nov. 25, 1921  9 Sheets-Sheet 6

July 3, 1928.

A. M. STANLEY ET AL 1,675,734

WELDING MACHINE

Original Filed Nov. 25, 1921    9 Sheets-Sheet 8

July 3, 1928.

A. M. STANLEY ET AL 1,675,734

WELDING MACHINE

Original Filed Nov. 25, 1921    9 Sheets-Sheet 9

Patented July 3, 1928.

1,675,734

UNITED STATES PATENT OFFICE.

ARTHUR M. STANLEY, OF LYNN, AND JAMES E. SIMS, OF QUINCY, MASSACHUSETTS, ASSIGNORS TO STANLEY STEEL WELDED WHEEL CORPORATION, OF BOSTON, MASSACHUSETTS, A CORPORATION OF DELAWARE.

WELDING MACHINE.

Application filed November 25, 1921, Serial No. 517,460. Renewed March 10, 1927.

This invention relates to a welding machine and more particularly to a machine for butt-welding the rims of a steel vehicle wheel of the type disclosed in the Stanley Patent No. 1,168,228, of January 11, 1916.

The object of the invention is to provide a welding machine of novel construction and operation, adapted to automatically butt-weld successive rim portions in an economical and superior manner.

To this end the improved welding machine includes welding electrodes and mechanism for automatically positioning a plurality of the rims to be welded with relation to the welding electrodes. In the operation of the machine successive rims are brought into a position to be operated upon by the welding electrodes, are clamped and then moved into abutting position. The welding current is then automatically caused to flow through the portions of the rim to be welded thus rapidly heating the same to welding temperature. After the welding temperature has been attained, provision is made for moving the opposed end portions of the rim toward one another to form a flash. After the flash has been formed the welding current is immediately cut off and the rims are maintained in this position until the weld has set. Thereafter the welded rim is unclamped and moved into a succeeding position, from which it is unloaded from the machine during the interval of the next welding operation.

These and other features of the invention are hereinafter described and pointed out in the claims.

In the drawings illustrating the preferred embodiment of the invention.

Figure 1:
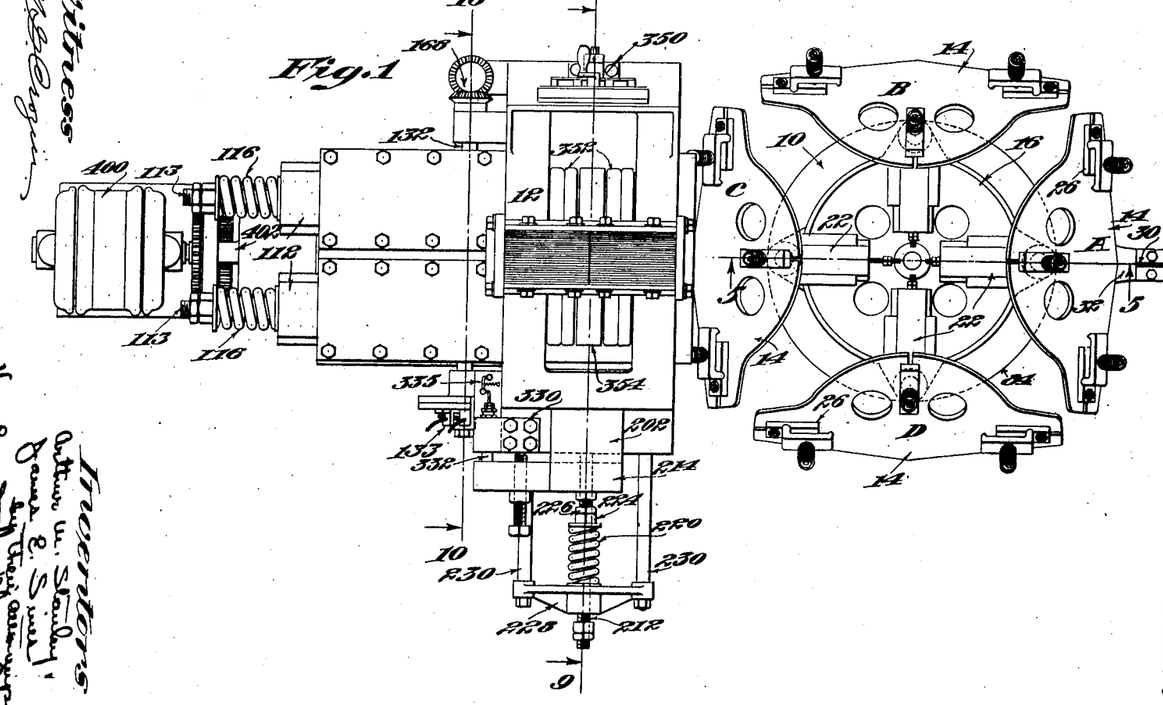
Fig. 1 is a plan view of the complete machine.
Figure 2:
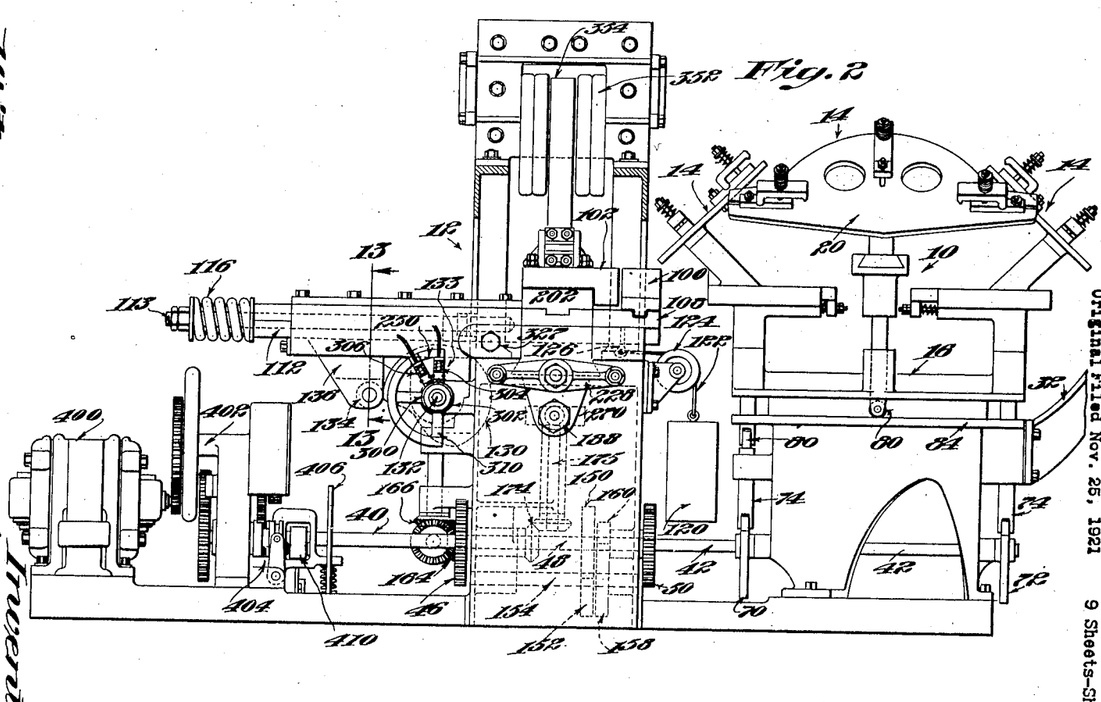
Fig. 2 is a front elevation of the machine.
Figures 3, 16:
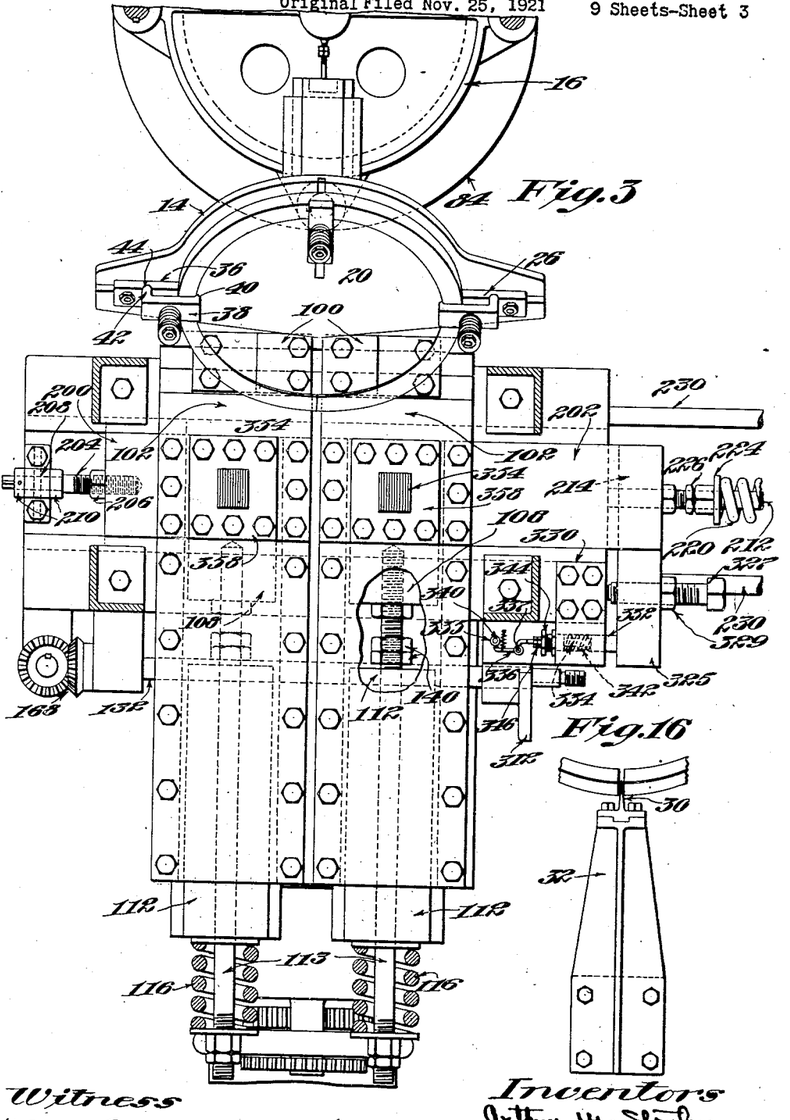
Fig. 3 is an enlarged plan view with transformer removed.
Fig. 16 is a detail of the knife edge positioning table.
Figure 5:
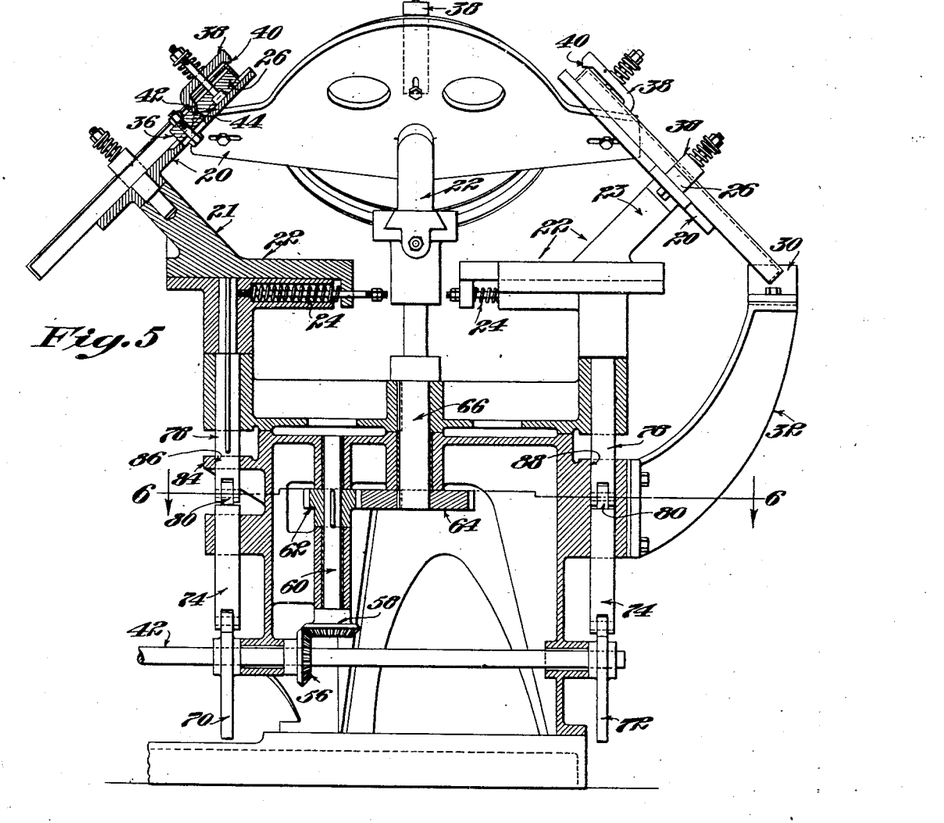
Fig. 5 is a sectional detail of the feed turret taken on line 5—5 of Fig. 1.
Figure 6:
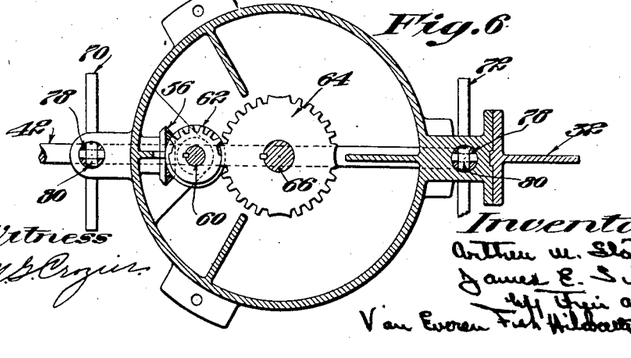
Fig. 6 is a section of turret showing drive taken on the line 6—6 of Fig. 5.
Figure 7:
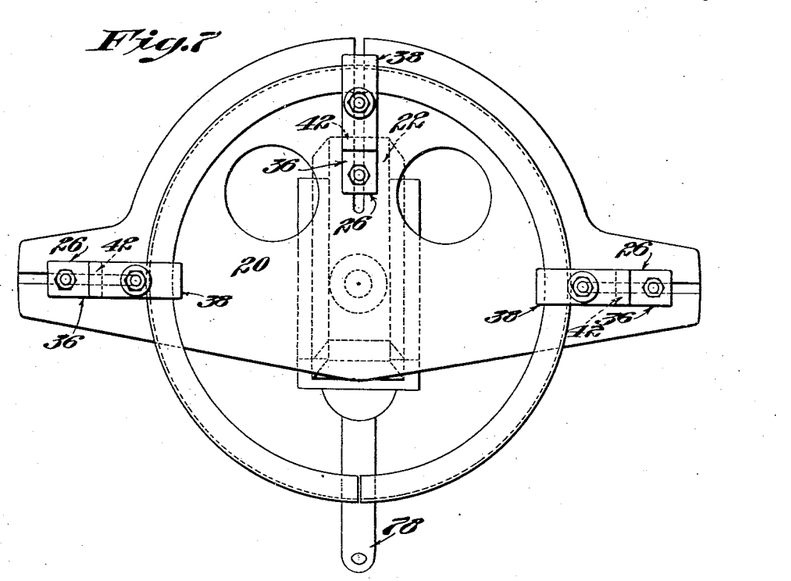
Fig. 7 is a detail of jig for holding rim.
Figure 8:
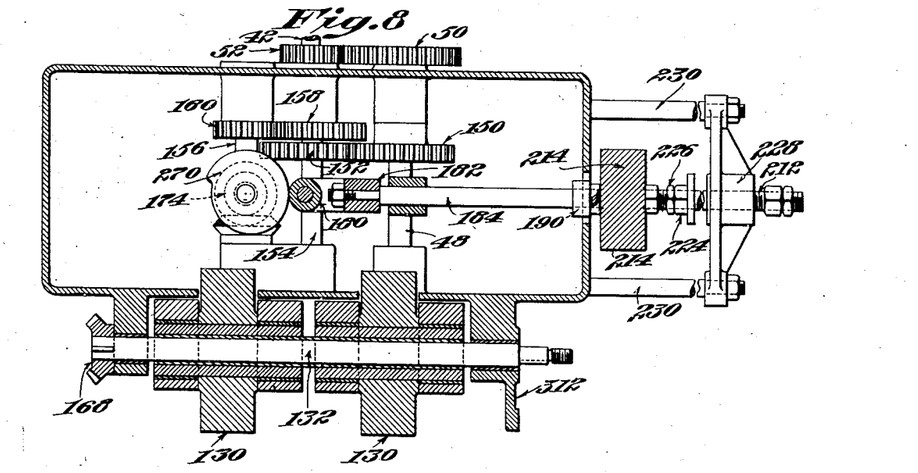
Fig. 8 is a horizontal section through body of the machine showing welding cams, etc., taken on line 8—8 of Fig. 10.

Referring to the drawings the illustrated machine comprises in general mechanism 10 for holding and positioning a plurality of the rims to be welded with relation to welding electrodes 12, as shown in Figs. 1 and 2. The mechanism 10 comprises in general four rim holding jigs 14 mounted to revolve with a revoluble turret 16, the latter being automatically revolved through successive arcs of 90 degrees each, as will be described. Each rim holding jig comprises a supporting disk 20 mounted in angular position, as shown in Fig. 5, upon the end of a carriage 22 indicated generally at 22, itself mounted upon the revoluble turret 16. The carriages 22 are of two parts, the upper being mounted in ways upon the lower. During the clamping operation, as will be described, the upper carriages move outwardly with relation to the lower carriages, coil springs 24 yielding at such time. The rim to be welded is retained upon the rim supporting disk by adjustable positioning blocks 26. The rim to be welded is placed upon the rim supporting disk in the loading position designated "A" in Fig. 1, and with the opposed end surfaces of the rim straddling a positioning knife edge 30 mounted upon the upper end of an arm 32 bolted to the machine body, as shown in Figs. 5 and 16. The rim is held in the desired position with relation to the rim supporting disk by the adjustable positioning blocks 26. Referring to Figs. 5 and 7 each positioning block 26 comprises an inner member 36 adjustably bolted to the rim supporting disk and over which the periphery of the rim is extended. An outer clip 38 is yieldingly held in a position to clamp the rim upon the rim supporting disk, the end 40 of the clip overlapping the outer edge of the rim. The clips 38 are provided with tail pieces 42 loosely received in slots 44 in the upper surface of the blocks, thus enabling the clip to rock about the tail piece as a pivot so that in assembling the rim in the rim supporting disk, the clips may be lifted and the rim readily inserted into the desired position.

The turret 16 is successively rotated through arcs of 90 degrees by mechanism actuated from the main driving shaft 40 and which is described as follows. Referring to Figs. 2, 5, 10 and 11, the rotations of the main drive shaft 40 (Fig. 2) are transmitted to the feed drive shaft 42 through spur gears 44, 46 upon the drive shaft 40 and a counter shaft 48, thence through Geneva gears 50 and 52 upon the shaft 48 and drive shaft 42, respectively. The design of the Geneva gears 50, 52 is such that a dwell is produced in the rotation of the feed drive shaft 42 of sufficient amplitude to enable the welding operations to be performed, as will be described. The rotations of the feed drive shaft 42 are transmitted to the revoluble turret 16 through beveled gears 56, 58, on the shaft 42 and on the end of a vertical shaft 60 respectively, and from the shaft 60 through Geneva gears 62 and 64 to the vertical shaft 66 upon which the turret 16 is secured. The Geneva gears 62, 64 are designed so that each revolution of the feed shaft 42 produces a quarter turn of the turret 16. From the description thus far it will be apparent that between the successive quarter turns of the turret 16 a dwell is produced resulting from the design of the Geneva gears 50, 52, of sufficient amplitude to enable the welding operation to be performed.

Figure 15:
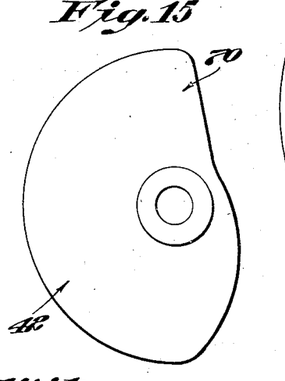
Fig. 15 is a detail of jig raising and lowering cam.

Referring to Fig. 5 the turret 16 and rim holding jigs are shown in the position in which the welding operation is being performed upon the left-hand rim, and in which the opposed ends of the rim in the right-hand rim holding jig straddle the positioning knife edge. Preparatory to the next rotation of the turret 16 through an arc of 90 degrees in order to move a succeeding rim into welding position, provision is made for raising both of the carriages 21 and 23. For this purpose raising cams 70, 72 mounted upon the feed drive shaft 42 operate through intermediate plungers 74 to lift the carriage plungers 78 through a sufficient distance so that rollers 80 upon the ends thereof may, when the turret is turned, ride upon the upper surface of a platform 84 (see Figs. 2 and 5). In this manner the rims are lifted from the positioning knife edge and from clamping blocks of the welding operation, as will be described, so that the turret may freely rotate through its next quarter turn. As the turret 16 completes each quarter turn, the carriage plungers corresponding to the carriages which are being moved into welding and loading positions respectively come to a position of rest immediately over holes 86, 88 in the platform 84, being held in this position at such time by the high parts of the raising cams 70, 72. As soon as the turret 16 has arrived at such position, it is locked through the Geneva gears 62 and 64 and immediately thereafter the carriage plungers in the welding and loading positions, drop the rims into a position to be clamped and over the positioning knife edge as is illustrated in Fig. 5, the design of the cam, as illustrated in Fig. 15, being such that the movements of the parts occur at such times.

After the turret 16 has moved a rim and the rim holding jig into a position to be operated upon by the welding electrodes, provision is made for clamping the portion of the rim to be welded between clamping blocks 100 and abutting blocks 102, (see Fig. 3). The clamping blocks 100 are of the general form illustrated in Figs. 17 and 18, having a rim engaging portion 104. The clamping blocks are bolted upon the forward ends of carriages 108 adapted to reciprocate in ways 110 in a set of transverse carriages to be described. A second set of carriages 112 are arranged to reciprocate in the ways 110 (see Figs. 2 and 3) and through interior passages in the latter elongated rods 113 are extended, the forward ends thereof being threaded and screwed into threaded holes in the carriages 108. Heavy coiled springs 116 embrace the rods 113, one end of the springs abutting collars on the ends of the second carriages 112 and the outer end abutting collars secured on the rods 113 by lock nuts, as shown in Fig. 2. Both sets of carriages are normally moved in a forward position by counter weights 120 connected to the carriages by cables 122 running over pulleys 124 and secured to eye bolts 126 projecting from the bottom of the carriages. In order to clamp the work between the clamping blocks 100 and abutting blocks 102 provision is made for moving the carriages rearwardly and for this purpose actuating cams 130 mounted upon the shaft 132 are caused to engage the cam rolls 134 in lugs 136 depending from the bottom of the second set of carriages 112. As the cams revolve the second set of carriages 112 are moved rearwardly and the movements thereof are transmitted through the springs 116 and rods 113 to the first set of carriages 108, causing the latter to move rearwardly. As the carriages 108 move rearwardly the clamping blocks 100 are brought into engagement with the portions of the rim to be welded, and thereafter further movement of the carriages 112 under the positive action of their actuating cams operates to cause compression of the springs 116 thereby producing a yielding clamping action upon the rims. The rods 113 are provided with stop nuts 140 against which the forward ends of the second set of carriages 112 rest during the opening movements of the clamping blocks 100. It will be apparent from an inspection of Fig. 3 that during the last part of the clamping operation in which the springs 116 are compressed that the forward ends of the carriages 112 move away from the stop nuts. It will also be observed that the cams 130 are designed to provide a continued period of dwell to afford ample opportunity for the welding operation to be performed while the work is firmly clamped between the blocks 100 and 102.

Figure 10:
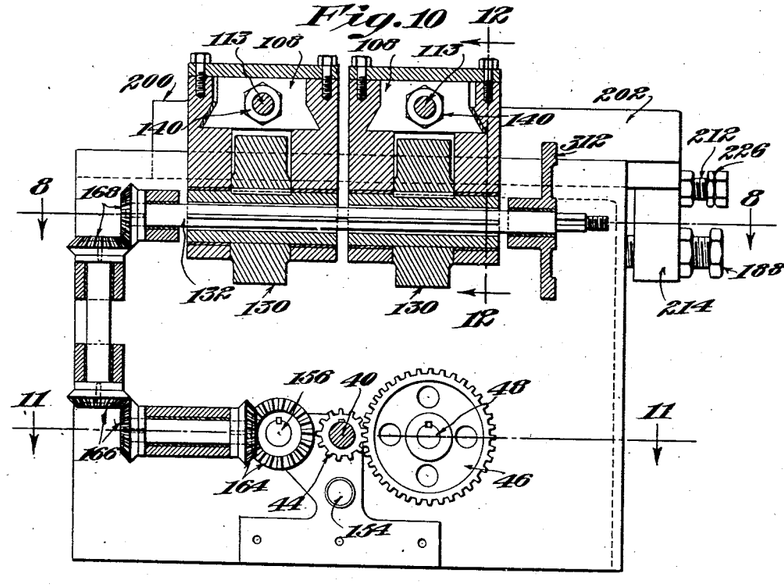
Fig. 10 is an elevation partly in section showing clamping cams and drive, taken on line 10—10 of Fig. 1.
Figure 11:
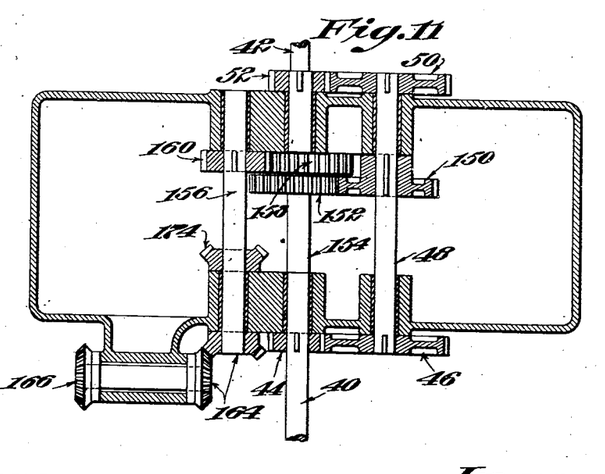
Fig. 11 is a horizontal section through machine body, taken on line 11—11 of Fig. 10.
Figure 12:
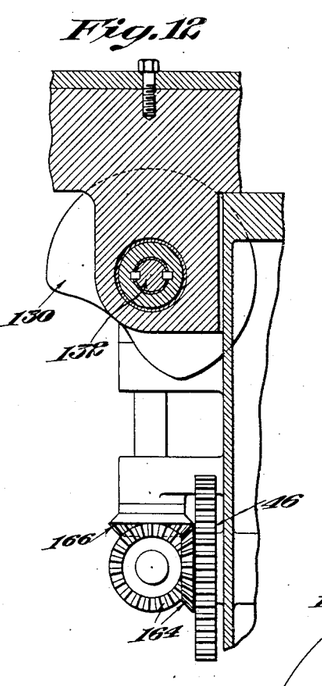
Fig. 12 is a sectional detail on line 12—12 of Fig. 10.
Figure 13:
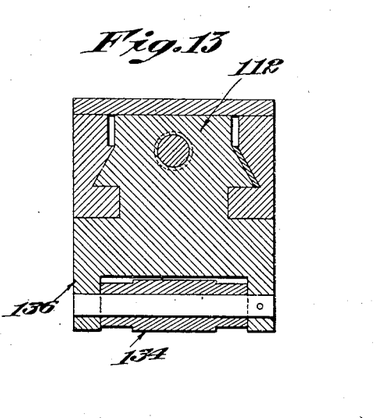
Fig. 13 is a sectional detail taken on the line 13—13 of Fig. 2.

The operation of clamping the rims between the blocks 100 and 102 is timed with relation to the feeding of the turret so as to enable the turret to present successive rims to a position to be clamped and so that the movement of the clamping blocks 100 under the actuation of the cams 130 may take place immediately after a rim has been thus presented to welding position. To this end provision is made for driving the cams 130 from the main drive shaft 40 through a gearing designed to produce the desired timing of the cams 130. For this purpose the counter shaft 48 of the gear train which drives the turret feed shaft 42, is provided with a spur gear 150 meshing with a second spur gear 152 on a second counter shaft 154. The rotations of the counter shaft 154 are transmitted to a third counter shaft 156 through Geneva gears 158, 160, designed similarly to the Geneva gears 50, 52 of the driving mechanism for the turret feed, so that the counter shaft 156 and the turret feed drive shaft 42 are rotated in timed relation to one another. The rotations of the counter shaft 156 are transmitted to the cam shaft 132 through three sets of beveled gears 164, 166, 168, as shown in Fig. 10, so that the cam shaft 132 and the cams 130 are thereby operated in timed relation to the feeding of the turret through the successive steps of 90 degrees each.

Figures 9, 17, 18:
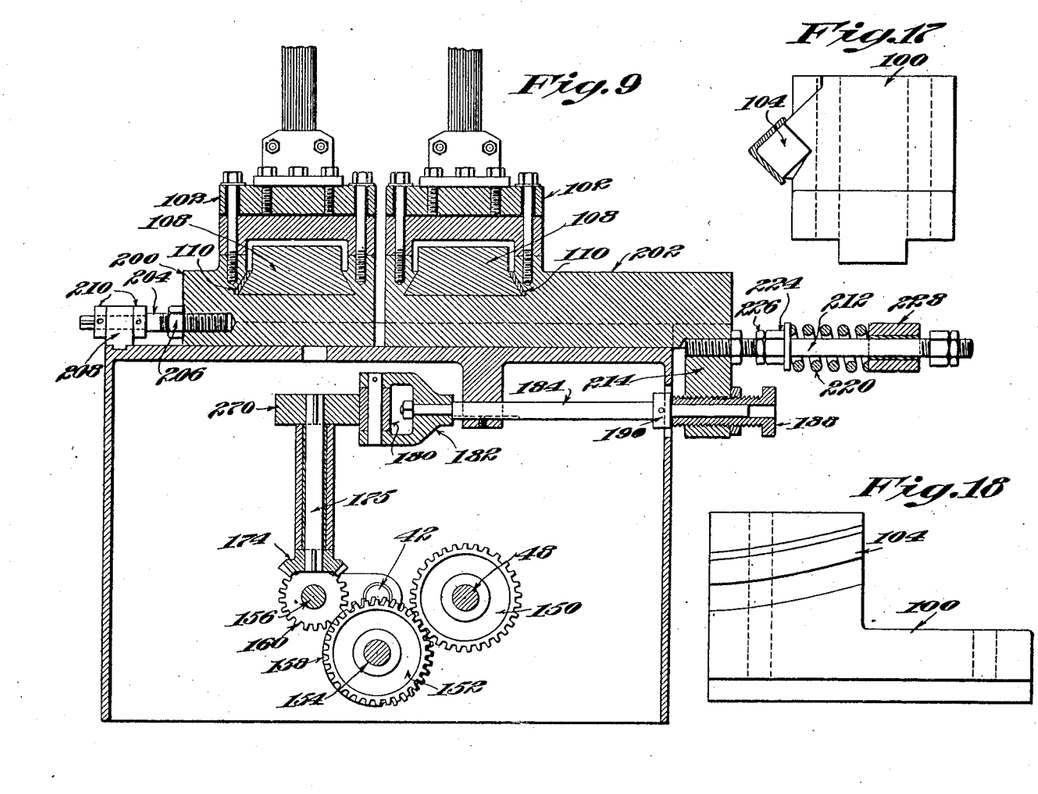
Fig. 9 is a vertical section through body of the machine, taken on line 9—9 of Fig. 1.
Fig. 17 is an end elevation of rim clamping block.
Fig. 18 is an inner face view of one of the clamping blocks.

From the description thus far it will be observed that after the rim has been presented by the intermittent turret feed to a welding position the portions of the rim to be welded are clamped between the clamping and abutting blocks 100 and 102. Provision is made for automatically moving the opposed sets of clamping and abutting blocks toward each other in order to bring the opposed surfaces of the rim to be welded into abutting position, in order that the welding current may immediately thereafter be turned on to perform the welding operation. For this purpose both sets of abutting blocks and clamping blocks together with the carriages 108, are mounted on transverse carriages 200, 202. The one carriage 200 is adjustably maintained in a stationary position by an adjusting bolt 204 threaded into the carriage and having a lock nut 206 in abutment therewith. The outer end of the adjusting bolt is received in a bearing block 208, and collars 210 pinned to the adjusting bolt enable the desired adjustment to be made by the rotation of the bolt with a crank or other tool slipped over the squared end thereof, as shown in Fig. 9.

Figure 14:
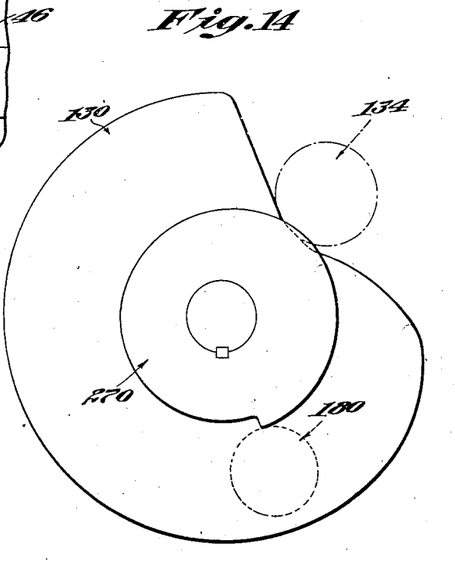
Fig. 14 is a comparative view of clamping and welding cams in timed relation.

The second carriage 202 is moved toward the first or stationary carriage 200 after the opposed portions of the rim have been clamped between the clamping and abutting blocks by the compression in a coiled spring 220 which embraces a rod 212 screwed into a depending portion 214 of the carriage 202. The ends of the coiled spring abut a stop collar 224 secured to the rod 212 by a lock nut 226, and a cross piece 228 secured in fixed relation to the body portion or frame of the machine by stud bolts 230. The operation of the coiled spring 220 in moving the carriage 202 is positively controlled by a cam 270 which is positively driven from the counter shaft 156 through beveled gears 174 and a vertical shaft 175 (see Fig. 9). A cam roller 180 cooperates with the surface of the controlling cam 270, being mounted in a yoke 182 secured upon the end of a connecting rod 184, the right hand end of which, viewing Fig. 9, extends into a hole in an adjusting bolt 188 screwed into the depending portion 214 of the carriage 202. The end of the adjusting bolt abuts a stop collar 190 pinned upon the connecting rod. The design of the controlling cam 270 is illustrated in Fig. 14 and is such that when the cam roller 180 drops off the high part of the cam, the compression in the coiled spring 220 is rendered operative to move the carriage 202 and the clamping and abutting blocks and portion of the rim held thereby to bring the ends of the rim into contact. By screwing in or out the adjusting bolt 188 the initial position of the carriage 202 may be adjusted.

After the opposed end surfaces of the rim have been thus brought into contact, provision is made for immediately turning on the welding current. The welding current is supplied from a source of supply (not shown) to the primary of the transformer, its flow being controlled by the commutator 133 mounted upon the end of the cam shaft 132. The commutator comprises preferably copper and fibre segments 300, 302 secured to and insulated from the cam shaft. Two brushes 304, 306, preferably of carbon cooperate with the segments. The brush 304 is stationary, being mounted in a bracket 310 bolted to a segmental bracket 312 fixed to the body portion or frame of the machine. The second brush 306 is mounted upon the segmental bracket having a clamp cooperating therewith to clamp the brush in any desired position. It will therefore be observed that the time at which the current is cut off may be varied by movement of the adjustable brush. The time at which the current comes on, however, is always the same, being controlled by the stationary brush. The construction of the commutator is that disclosed in my co-pending application, to which reference may be had for further detailed description thereof.

After the rims to be welded have attained welding temperature the compression in the coiled spring 220 serves to move the rims toward each other sufficiently to form a weld. Provision is made for limiting the movement of the carriage 202 at this time, and for this purpose a boss 325 extends rearwardly from the side of the carriage 202. An adjustable stop bolt 327 is screwed through the boss 325 and is maintained in adjusted position with relation to the boss by a set nut 329. The adjustable stop bolt 327 is positioned with respect to the boss 325 so that the end of the bolt is spaced a short distance from a bracket 330 bolted to the machine frame at a point adjacent the boss 325. The length of the space between the end of the bolt 327 and the bracket defines the extent to which a flash is turned up during the welding operation. When, therefore, the metal in the portions of the rim to be welded attains welding temperature, the carriage 202 moves inwardly until the end of the bolt 327 is brought into engagement with the bracket 330. During this movement of the carriage 202 the boss 325 engages a plunger 332 slidably received in a hole in the bracket 330. The plunger is provided with a reduced stem 334 the end of which is adapted to engage one arm of a bell crank 336 pivoted at 337. The second arm of the bell crank comprises the movable member of a cut off switch 335, and as the plunger 332 moves inwardly the end of the stem 334 swings the bell crank, thus swinging the second arm of the bell crank away from the stationary member 340 of the cut off switch and operating to cut off the welding current. The plunger 332 is normally maintained in extended position by a coiled spring 342 adjustably maintained under compression by a stop nut 344. Limiting nuts 346 are also provided upon the end of the stem to limit the outward movement of the plunger. The cut off switch is timed to operate in advance of the time that the circuit leading to the primary of the transformer is opened by the commutator 133.

Figure 4:
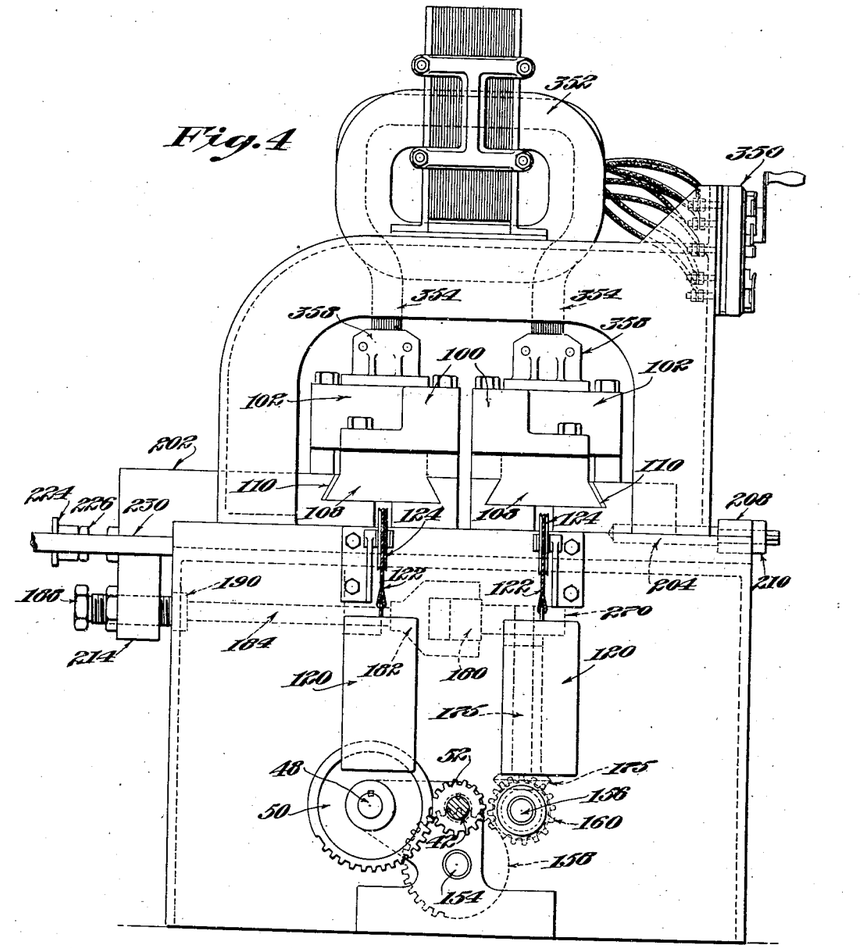
Fig. 4 is a rear elevation.

The current for performing the welding operation is supplied from a source of supply (not shown) to a commutator 133 mounted upon the end of the shaft 132. From the commutator the current is conducted through a rheostat illustrated diagrammatically at 350 mounted upon the machine frame and by which the magnitude of the current may be adjustably controlled by the operator. From the rheostat 350 the current is led to the primary winding 352 of the transformer, the secondary 354 of which is connected directly to electrode holders 358, as shown in Fig. 4. The cut off switch 335 is interposed into a primary circuit to cut off the welding current in advance of the opening of the circuit by the commutator 133, as has been described.

The main driving shaft 40, by which the turret feed and also the operation of the clamping blocks 100 are actuated, is itself driven from an electric motor 400 or other source of power through a reducing gear train illustrated generally by the reference 402. The design of the reducing gear train is preferably that disclosed in our co-pending application for welding machines, filed on even date herewith, to which reference may be had for a more detailed illustration.

In order to start and stop the machine a clutch indicated generally at 404 is provided adapted to be operated manually by a lever 406. It is desirable that the clutch should be designed to cause the machine to be stopped at a predetermined position independently of the exact time at which the lever 406 is thrown out. The point in the cycle of operations of the machine at which it is most desirable to stop the machine is in the position assumed when the clamping blocks 100 are in their extreme forward position and just before the turret feeding mechanism commences to present a succeeding rim to a welding position. The mechanism for actuating the clutch to accomplish this result comprises preferably that disclosed in my co-pending application above referred to and includes in general a cam 410 having a cam surface (not shown) with which a plunger operated by the lever 406 cooperates. The cam 410 is set in timed relation to the cycle of operations of the machine, so that when the lever 406 is thrown out the plunger engages the cam and rides around it until brought up against a cam surface to stop the machine at the desired point in the cycle of operations thereof, namely when the clamping blocks 100 are in their extreme forward position and just before a succeeding step in the operation of the turret feed.

While the invention has been illustrated and described as embodied in a machine for butt-welding the rims of a steel vehicle wheel, it is to be understood that certain features of the invention may be used to advantage in welding other articles as defined in the following claims.

We claim:

1. A machine for butt welding rim portions of a vehicle wheel having, in combination, welding electrodes, rim holding means, and means for relatively moving the welding electrodes and rim holding means to present successive circular rim portions to a position to weld adjacent ends of the rim portions.

2. A machine for butt welding rim portions of a vehicle wheel having, in combination, welding electrodes, means for holding circular rims, means for relatively moving the welding electrodes and rim holding means to present successive rim portions to a position to be welded, and means for retaining the adjacent ends of the rim portions in abutment while in welding position.

3. A machine for butt welding rim portions of a vehicle wheel having, in combination, rim holding means, comprising a plurality of rim holding jigs, and means for intermittently rotating the rim holding jigs to present successive rim portions to a position to be welded.

4. A machine for butt welding rim portions of a vehicle wheel having, in combination, welding electrodes, rim holding means comprising a plurality of rim holding jigs, and means for intermittently rotating the jigs to present successive rim portions to a position to be welded, and means for retaining portions of the rim in abutment while in welding position.

5. A machine for butt welding rim portions of a vehicle wheel having, in combination, welding electrodes, rim holding means comprising a rotatable turret, a plurality of rim holding jigs mounted on the turret, means for intermittently rotating the turret to present successive rim portions to a position to be welded, and clamping devices for retaining the portions of the rim in abutment while in welding position.

6. A machine for butt welding rim portions of a vehicle wheel having, in combination, welding electrodes, means for presenting successive rim portions to the welding electrodes, means for clamping adjacent ends of the rim portions in abutment while in welding position including stationary abutment blocks and clamping blocks, and means for moving the clamping blocks into and out of operative position in timed relation to the presentation of rim portions to a welding position.

7. A machine for butt welding rim portions of a vehicle wheel having, in combination, welding electrodes, rim holding means, means for automatically moving the rim holding means to present successive rim portions to welding position, a clamping mechanism for retaining adjacent ends of the rim in abutment while in welding position, and means for operating the clamping mechanism in timed relation to the operation of the rim holding means.

8. A machine for butt welding rim portions of a vehicle wheel having, in combination, welding electrodes, rim holding means, means for moving the rim holding means to present successive rim portions to welding position, means for clamping adjacent ends of the rim portions in abutment while in welding position comprising movable clamping blocks, and means for moving the clamping blocks including a reciprocating carriage, and connections between the carriage and the means for moving the rims into welding position, whereby the clamping devices are operated in timed relation to the movements of the rims into welding position.

9. A machine for butt welding rim portions of a vehicle wheel having, in combination, welding electrodes, rim holding means, means for automatically moving the rim holding means to present successive rim portions to welding position including a driven shaft, means for clamping adjacent ends of the rim portions after they have arrived into welding position, and means actuated by said driven shaft for operating said clamping means.

10. A machine for butt welding rim portions of a vehicle wheel having, in combination, welding electrodes, means for presenting successive rim portions to a welding position, means for clamping each rim portion while in welding position, means for relatively moving the rim portions into abutment while thus clamped, and means for thereafter performing the welding operation.

11. A machine for butt welding rim portions of a vehicle wheel having, in combination, welding electrodes, means for presenting successive rim portions to the welding electrodes, means for clamping each rim portion after it has arrived into welding position, means for moving the rim portions into abutment while thus clamped, a commutator for turning on the welding current immediately after the rim portions have been brought into abutment, and means for exerting yielding pressure upon the rim portions to form the weld.

12. A machine for butt welding rim portions of a vehicle wheel having, in combination, welding electrodes, rim holding means including a revoluble turret, rim clamping devices mounted on the turret, means for intermittently rotating the turret to present successive rim portions to welding position, and electrode operating mechanism for performing the welding operation.

13. A machine for butt welding rim portions of a vehicle wheel having, in combination, welding electrodes, rim holding means including a revoluble turret, rim clamping devices mounted on the turret, means for intermittently rotating the turret to present successive rim portions to welding position, and clamping means for holding the rim portions in abutting position during the welding operation.

14. A machine for butt welding rim portions of a vehicle wheel having, in combination, welding electrodes, rim holding means including a revoluble turret, clamping devices mounted thereon, means for intermittently rotating the turret to present successive rim portions to welding position, and means actuated in timed relation to the movements of the turret for clamping the rim portions in abutment immediately after they are presented to welding position.

15. A machine for butt welding rim portions of a vehicle wheel having, in combination, welding electrodes, rim holding means including a revoluble turret, clamping devices mounted thereon, means for intermittently rotating the turret to present successive rim portions to welding position, means actuated in timed relation to the movements of the turret for clamping the rim portions in abutment immediately after they are presented to welding position, and means for automatically turning on the welding current after said rim portions have been clamped in abutment.

16. A machine for butt welding rim portions of a vehicle wheel having, in combination, welding electrodes, means for presenting successive rim portions to welding position, electrode operating mechanism, and means for clamping the rim portions in abutment after they have arrived in welding position including reciprocating carriages, clamping devices for the opposed rim portions mounted upon the carriages, and means for reciprocating the carriages to operate the clamping devices in timed relation to the presentation of the rims to welding position.

17. A machine for butt welding rim portions of a vehicle wheel having, in combination, welding electrodes, a plurality of rim holding jigs, means for automatically moving the rim holding jigs to present successive rim portions to welding position including a driven shaft and connections between the driven shaft and the jigs, clamps for clamping the opposed ends of the rim to be welded in abutting position, and means for automatically operating the clamping devices in timed relation to the movements of the wheel holding jigs including a cam and connections between the cam and driven shaft.

18. A machine for butt welding rim portions of a vehicle wheel having, in combination, welding electrodes, a plurality of rim holding jigs, clamping devices for clamping the ends of the rim to be welded in abutment including movable blocks, carriages upon which said blocks are mounted, and cams cooperating with the carriages for moving the latter in timed relation to the movements of the rim holding jigs to clamp the rims immediately after they have been moved into welding position.

19. A machine for butt welding rim portions of a vehicle wheel having, in combination, welding electrodes, a plurality of rim holding jigs, means for automatically moving the jigs to present successive rim portions to welding position, means for clamping the opposed ends of the rim in abutment after the rim has been moved into welding position, means for immediately thereafter turning on the welding current, and means for exerting a yielding pressure upon the opposed ends to perform the weld.

20. A machine for butt welding rim portions of a vehicle wheel having, in combination, welding electrodes, a plurality of rim holding jigs, means for automatically moving the jigs to present successive rim portions to welding position, means for clamping the opposed ends of the rim in abutment after the rim has been moved into welding position, said means including a normally compressed spring and a controlling cam for permitting the operation of the spring at the requisite time.

21. A machine for butt welding rim portions of a vehicle wheel having, in combination, a frame, means for presenting successive rim portions to welding position, welding electrodes, a carriage upon which one electrode is mounted, a clamping device for one portion of the rim to be welded mounted upon the carriage, a spring cooperating with the carriage, a cam normally maintaining the spring under compression and arranged to permit the compression of the spring to be exerted upon the carriage and to thereby move the rim portions into abutment at a predetermined time and for thereafter exerting a yielding pressure upon the said carriage during the welding operation.

22. A machine for butt welding rim portions of a vehicle wheel having, in combination, a frame, means for presenting successive rim portions to welding position, welding electrodes, carriages movably mounted in the frame and upon which the welding electrodes are mounted, means for adjustably maintaining one carriage in fixed relation to the frame, clamping devices carried by each carriage, and means for yieldingly pressing the second carriage toward the first carriage after the rim portions have been clamped.

23. A machine for butt welding rim portions of a vehicle wheel having, in combination, a frame, means for presenting successive circular rim portions to welding position, welding electrodes, carriages movably mounted in the frame and upon which the welding electrodes are mounted, means for adjustably maintaining one carriage in fixed relation to the frame, clamps carried by each carriage and adapted to engage opposite end portions of the rim, means for automatically turning on the welding current, and means for automatically pressing the carriages toward one another to perform the weld.

24. A machine for butt welding rim portions of a vehicle wheel having, in combination, welding electrodes, means for presenting successive rim portions to welding position, a clamping device for each portion of the rim to be welded, means for operating the clamping device to clamp the rim portions after they have been presented to welding position, means for relatively moving the clamping devices to bring the end portions of the rim into abutment, and means for exerting a pressure between the rim portions to be welded to perform the weld.

25. A machine for butt welding rim portions of a vehicle wheel having, in combination, welding electrodes, means for presenting successive rim portions to welding position, a clamping device for each portion of the rim to be welded, means for operating the clamping device to clamp the rim portions after they have been presented to welding position, means for relatively moving the clamping devices to bring the end portions of the rim into abutment, means for exerting a pressure between the rim portions to be welded to perform the weld, and means actuated by movement of the clamping devices during the welding operation to automatically cut off the welding current.

26. A machine for butt welding rim portions of a vehicle wheel having, in combination, welding electrodes, rim holding means, means for automatically moving the rim holding means to present successive rim portions to welding position, means for clamping the rim portions after arrival in welding position, means for moving the opposed ends of the rim into abutment, means for thereafter turning on the welding current, means for yieldingly pressing the ends to be welded toward one another to form the weld, means actuated by such movement for cutting off the welding current, means for automatically releasing the clamping devices after the welding operation has been performed, and means for automatically moving the rim holding means to move the rim from welding position.

27. In a machine for butt welding rim portions of a vehicle wheel, the combination of welding electrodes, and rim holding means including a revoluble turret, a plurality of disks mounted upon the turret to revolve therewith, and clamping devices for retaining the rims upon the disks.

28. In a machine for butt welding rim portions of a vehicle wheel, the combination of welding electrodes, and rim holding devices including an intermittently rotating turret, a plurality of inclined supporting disks mounted upon the turret, means for positioning the rims upon one of the disks in one of the positions through which the turret is intermittently rotated so that the opposed end portions of the rim are nearly in abutment, and clamping devices carried by each disk for retaining the rims in operative position upon the disks.

29. In a machine for butt welding rim portions of a vehicle wheel, the combination of welding electrodes, rim holding devices, means for intermittently revolving the rim holding devices to present successive rims to welding position, clamping means for engaging the rim in welding position, the rim holding means being arranged to yield upon the operation of the clamping devices.

30. In a machine for butt welding rim portions of a vehicle wheel, the combination of welding electrodes, and rim supporting means including a stationary table, a turret mounted thereon and adapted to revolve thereon, means for intermittently revolving the turret, a plurality of rim supporting disks mounted upon the turret, and a knife edge secured to the table and adapted to cooperate with the rim when in loading position to position the rim so that the opposed ends are nearly in abutment.

31. In a machine for butt welding rim portions of a vehicle wheel, the combination of welding electrodes, rim supporting means including a stationary table, a turret mounted thereon and adapted to revolve thereon, means for intermittently revolving the turret, a plurality of rim supporting disks mounted upon the turret, and a knife edge secured to the table and adapted to cooperate with the rim when in loading position to position the rim so that the opposed ends are nearly in abutment, and means for automatically lifting the rim supporting disks prior to rotation of the turret in order to withdraw the rim from engagement with the knife edge.

32. In a machine for butt welding the rim portions of a vehicle wheel, the combination of welding electrodes, and means for clamping the opposed portions of the rim to be welded in welding position including two reciprocating carriages, clamps carried thereby, and means for automatically moving the carriages to automatically clamp the opposed end portions of the rim in abutment after it has been moved to welding position by said devices.

33. In a machine for butt welding the rim portions of a vehicle wheel, the combination of a frame, welding electrodes mounted thereon, abutment blocks secured to a stationary part of the frame, and movable clamping blocks for clamping the opposed end portions of the rim in abutment to be welded between them and the abutment blocks.

34. In a machine for butt welding the rim portions of a vehicle wheel, the combination of a frame, welding electrodes mounted thereon, clamping devices for each of the opposed portions of the rim to be welded including two reciprocating carriages, means for simultaneously moving the carriages to clamp both portions of the rim, and means for thereafter relatively moving the clamping devices to bring the end portions of the rim into abutment.

35. In a machine for butt welding the rim portions of a vehicle wheel, the combination of a frame, two carriages mounted therein and capable of movement transversely thereof, welding electrodes mounted upon each carriage, clamping devices mounted upon each carriage, means for simultaneously operating the clamping devices to clamp the opposed portions of the rim to be welded, and means for thereafter relatively moving the carriages to bring the opposed end portions of the rim into abutment.

36. In a machine for butt welding the rim portions of a vehicle wheel, the combination of a frame, two carriages mounted thereon and capable of movement transversely thereof, welding electrodes carried by each carriage, a clamping device carried by each carriage including clamping blocks, and a second set of carriages slidably mounted in the first set of carriages and capable of movement longitudinally of the frame, means for moving the second set of carriages to clamp the work, and means for thereafter relatively moving the second set of carriages to bring the end portions of the work into abutment.

37. In a machine for butt welding the rim portions of a vehicle wheel, the combination of a frame, two carriages mounted thereon and capable of movement transversely thereof, welding electrodes carried by each carriage, clamping devices carried by each carriage, means for adjustably retaining one of the carriages in stationary position, and means for relatively moving the carriages to bring the end portions of the work into abutment including a spring and a cam for normally maintaining the spring under compression and permitting the spring to act upon the carriage to move the same at a predetermined time.

38. In a machine for butt welding the rim portions of a vehicle wheel, the combination of a frame, a carriage mounted thereon and capable of movement transversely thereof, a welding electrode carried by the carriage, a clamping device for clamping one of the opposed portions of the rim to be welded, means for moving said carriage to bring the end portions of the rim into abutment, means for exerting yielding pressure upon the carriage during the welding operation, and means for cutting off the welding current upon movement of the carriage as the weld is formed.

39. In a machine of butt welding the rim portions of a vehicle wheel, the combination of a frame, carriages mounted thereon and capable of movement transversely thereof, welding electrodes carried by each carriage, clamping devices carried by each carriage, means for relatively moving the carriages to bring the end portions of the rim into abutment including a spring and a cam arranged to normally maintain the spring under compression and to permit the carriage to be moved at a predetermined time, means for turning on the welding current after the rims have been brought into abutment, said cam being designed to permit the spring to yieldingly press the opposed rim portions together during the welding operation.

40. In a machine for butt welding the rim portions of a vehicle wheel, the combination of a frame, carriages mounted thereon and capable of movement transversely thereof, clamping devices carried by the carriages, means for moving the carriages to bring the end portions of the rim into abutment, means for exerting pressure upon the carriages during the welding operation, and means actuated by movement of the carriages for cutting off the welding current, said means including a cut off switch, a boss carried by the carriage, and a member positioned in the path of the boss arranged to be engaged and moved thereby to thereby operate the cut off switch.

ARTHUR M. STANLEY.
JAMES E. SIMS.